United States Patent Office 2,734,057
Patented Feb. 7, 1956

2,734,057

CHLORTHEOPHYLLINE SALT OF DIMETHYL-AMINOPROPYLCHLOR-PHENTHIAZINE

Paul Gailliot, Paris, and Jacques Gaudechon, Thiais, France, assignors to Societe des Usines Chimiques, Rhone-Poulenc, Paris, France, a French body corporate No Drawing. Application December 26, 1952,
Serial No. 328,136

Claims priority, application France January 5, 1952

1 Claim. (Cl. 260—243)

This invention concerns new therapeutically valuable phenthiazine derivatives and processes for their production.

It is known that various therapeutically active basic phenthiazine derivatives containing in the 10-position a dialkylaminoalkyl substituent will form salts with 8-haloxanthines such as 8-chlorotheophylline and it has been suggested that these salts are superior to the phenthiazine derivatives from which they are derived, in that they elicit fewer or less marked undesirable side reactions and toxic manifestations. Protracted research and experimentation has, however, shown that, while certain of such salts have outstanding therapeutic properties rendering them more suitable than the corresponding phenthiazine base for particular medical applications, there are many such salts that are of no therapeutic value. It is furthermore impossible to predict a priori that such a salt of a given phenthiazine base will have any special therapeutic value or indeed any therapeutic value whatsoever.

According to the present invention, it has now been found that the hitherto unknown 8-chloro-theophyllinates of 10-(3'-dimethylaminopropyl)-chlorophenthiazines corresponding to the following general formula:

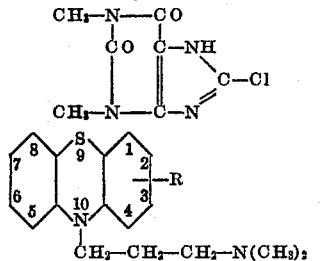

(wherein R represents a chlorine atom in the 1- or 3-position of the phenthiazine nucleus), have outstanding usefulness in the treatment of travel or motion sickness (sea sickness, air sickness, etc.) in respect of which they show advantage over the phenthiazine bases from which they are derived.

The new salts of the present invention may be prepared by heating 8-chloro-theophylline under reflux with the appropriate 10-(3'-dimethylamino-propyl)-chlorophenthiazine, employed in the theoretical quantity or in slight excess, in an inert organic solvent, for example, methyl or ethyl alcohol, acetone (which may be aqueous) or chloroform. The salt produced may be recovered by evaporating the solvent.

The new salts of the present invention may also be prepared by heating, at a temperature of from 50° C. to 100° C. and in the absence of solvent, a molten mixture of 8-chloro-theophylline with a substantially equimolecular proportion of the appropriate 10-(3'-dimethylamino-propyl)-chlorophenthiazine.

The 10-(3'-dimethylamino-propyl)-chlorophenthiazine used as starting material may be the 1-chlorophenthiazine or the 3-chlorophenthiazine compound, or a mixture of these isomers, methods of production and properties of which are described in co-pending application No. 262,171, now U. S. Patent 2,645,640. One of said isomers is characterised by a hydrochloride having a M. P. of 179–180° C. and a picrate having a M. P. of 172–173° C. The other of said isomers is characterised by a hydrochloride having a M. P. of 169–170° C. and a picrate having a M. P. of 142–143° C. The first of these isomers leads to the more important 8-chloro-theophyllinate of this invention which, in the treatment of travel and motion sickness, has been found to be substantially more effective than the analogous 8-chloro-theophyllinate of 10-(2'-dimethylamino-propyl)-phenthiazine, which has already been used in clinical medicine for the same purpose.

The following example illustrates one manner of preparing the salts of the present invention.

Example 24.8 g. of a 10-(3'-dimethylamino-propyl)-chlorophenthiazine (the hydrochloride of which has a M. P. of 179–180° C., and the picrate of which has a M. P. of 172–173° C.) are heated under reflux for about an hour with 16.5 g. of 8-chloro-theophylline in 300 cc. of ethyl alcohol. The mixture is treated with carbon black and filtered hot. The product is evaporated to dryness in vacuo, the temperature being progressively raised to 90° C. 41.3 g. of the 8-chloro-theophyllinate of the 10-(3'-dimethylamino-propyl)-chlorophenthiazine starting material are thus obtained as a product melting at about 100° C. (instantaneous melting point on the Maquenne block).

By proceeding in the same manner using as starting material a 10-(3'-dimethylamino-propyl)-chlorophenthiazine the hydrochloride of which has a M. P. of 169–170° C. and the picrate of which has a M. P. of 142–143° C. the corresponding 8-chloro-theophyllinate is obtained.

We claim:

The 8-chloro-theophyllinate of the 10-(3'-dimethylamino-propyl)-3-chlorophenthiazine of which the hydrochloride melts at about 179–180° C. and the picrate melts at about 172–173° C.

References Cited in the file of this patent

UNITED STATES PATENTS

| | | |
|---|---|---|
| 2,499,058 | Cusic | Feb. 28, 1950 |
| 2,534,235 | Cusic | Dec. 19, 1950 |
| 2,534,236 | Cusic | Dec. 19, 1950 |
| 2,534,237 | Cusic | Dec. 19, 1950 |
| 2,534,240 | Cusic | Dec. 19, 1950 |
| 2,534,241 | Cusic | Dec. 19, 1950 |
| 2,534,242 | Cusic | Dec. 19, 1950 |
| 2,534,243 | Cusic | Dec. 19, 1950 |
| 2,534,244 | Cusic | Dec. 19, 1950 |
| 2,534,245 | Cusic | Dec. 19, 1950 |
| 2,534,246 | Cusic | Dec. 19, 1950 |
| 2,534,247 | Cusic | Dec. 19, 1950 |
| 2,590,125 | Robinson | Mar. 25, 1952 |
| 2,591,679 | Cusic | Apr. 8, 1952 |
| 2,602,793 | Cusic | July 8, 1952 |
| 2,645,640 | Charpentier | July 14, 1953 |
| 2,650,919 | Cusic | Sept. 1, 1953 |

FOREIGN PATENTS

| | | |
|---|---|---|
| 506,006 | Canada | Sept. 21, 1954 |